United States Patent
Wilhelmsson et al.

(10) Patent No.: US 7,945,206 B2
(45) Date of Patent: May 17, 2011

(54) DATA PACKET TRANSMISSION SCHEDULING IN A MOBILE COMMUNICATION SYSTEM

(75) Inventors: Leif Wilhelmsson, Dalby (SE); Stefan Parkvall, Stockholm (SE); Johan Sköld, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 38 days.

(21) Appl. No.: 12/365,196

(22) Filed: Feb. 4, 2009

(65) Prior Publication Data
US 2010/0195584 A1 Aug. 5, 2010

(51) Int. Cl.
H04B 7/185 (2006.01)
H04B 1/16 (2006.01)
H04W 40/00 (2009.01)

(52) U.S. Cl. ........... 455/12.1; 455/343.4; 455/445; 455/521; 370/328; 370/347; 370/352; 370/401; 370/536; 375/145

(58) Field of Classification Search .......... 455/12.1, 455/343.4, 455, 521; 370/328, 347, 352, 370/401; 375/145
See application file for complete search history.

(56) References Cited

U.S. PATENT DOCUMENTS

| | | | | |
|---|---|---|---|---|
| 5,488,631 A | * | 1/1996 | Gold et al. | 375/145 |
| 6,160,994 A | * | 12/2000 | Wiedeman | 455/12.1 |
| 6,553,021 B1 | * | 4/2003 | Bishop et al. | 370/347 |
| 6,917,621 B1 | * | 7/2005 | Silver | 370/401 |
| 7,046,649 B2 | | 5/2006 | Atwater et al. | |
| 7,092,412 B1 | * | 8/2006 | Rezvani et al. | 370/536 |
| 7,167,484 B2 | | 1/2007 | Liang et al. | |
| 7,263,379 B1 | * | 8/2007 | Parkulo et al. | 455/521 |
| 7,558,557 B1 | * | 7/2009 | Gollnick et al. | 455/343.4 |
| 2002/0136233 A1 | | 9/2002 | Chen et al. | |
| 2006/0205401 A1 | | 9/2006 | Palin et al. | |
| 2007/0015514 A1 | * | 1/2007 | Bishop | 455/445 |
| 2007/0109991 A1 | * | 5/2007 | Bennett | 370/328 |
| 2007/0177542 A1 | | 8/2007 | Hirsch | |
| 2007/0223430 A1 | | 9/2007 | Desai et al. | |
| 2007/0232358 A1 | | 10/2007 | Sherman | |
| 2008/0130620 A1 | | 6/2008 | Liu et al. | |
| 2008/0247367 A1 | | 10/2008 | Guo et al. | |
| 2008/0299987 A1 | | 12/2008 | Iyer et al. | |
| 2009/0059899 A1 | * | 3/2009 | Bendelac | 370/352 |

OTHER PUBLICATIONS

Golmie, N., "Bluetooth Dynamic Scheduling and Interference Mitigation", Mobile Networks and Applications (Springer), vol. 9, No. 1, 2004, pp. 21-31.

Cordeiro, C. et al., "BlueStar: Enabling Efficient Integration Between Bluetooth WPANs and IEEE 802.11 WLANs", Mobile Networks and Applications (Springer), vol. 9, No. 4, 2004, pp. 409-422.

(Continued)

*Primary Examiner* — William D Cumming
(74) *Attorney, Agent, or Firm* — Potomac Patent Group PLLC

(57) ABSTRACT

A communication device has a first transceiver that operates in a first communication system in the presence of a second transceiver that operates in a second communication system that is unrelated to the first communication system. A scheduler of packets for transmission by the first transceiver uses information about when the second communication system will be transmitting a signal that will interfere with reception by the first transceiver, and schedules data for which retransmission is not essential in those time slots in which an implicit NACK is expected due to the second transceiver's operation.

20 Claims, 9 Drawing Sheets

OTHER PUBLICATIONS

Chiasserini, C. et al., "Coexistence mechanisms for interference mitigation between IEEE 802.11 WLANs and Bluetooth", Proceedings of the 21st IEEE Annual Joint Conference of the IEEE Computer and Communications Societies (INFOCOM 2002), vol. 2, pp. 590-598.

Sevillano J.L. et al., "Soft real-time communications over Bluetooth under interferences from ISM devices", International Journal of Communication Systems, 2006, vol. 19, No. 10, pp. 1103-1116.

PCT International Search Report, mailed May 17, 2010, in connection with International Application No. PCT/EP2010/051350.

Chiasserini, C. et al.: "Coexistence mechanisms for interference mitigation in the 2.4-ghz ism band" IEEE Transactions on Wireless Communications, IEEE Service Center, Piscataway, NJ, US LNKD-DOI:10.1109/ TWC.2003.817417, vol. 2, No. 5, Sep. 1, 2003, pp. 964-975, XP011100603, ISSN: 1536-1276.

* cited by examiner

DATA PACKET TRANSMISSION SCHEDULING IN A MOBILE COMMUNICATION SYSTEM

BACKGROUND

The present invention relates to wireless telecommunication systems, and more particularly to methods and apparatuses that enable multiple radio systems to operate in the same or close radio spectra and/or located geographically near to each other.

When a few decades ago, spectrum regulations were changed to allow commercial radio applications in unlicensed bands, interest was marginal. But this interest has changed radically in the last few years. After the worldwide success of mobile telephony in licensed bands, capacity limitations and huge license fees have spurred the interest of radio applications in the unlicensed band. In the past few years, communications systems such as those operating in accordance with the Wireless Local Area Network (WLAN) IEEE 802.11 standards and the Bluetooth® standards have been increasingly deployed in the 2.4 GHz band. Moreover, new communications systems are being worked on, such as the Wireless Personal Area Network (WPAN) activity under IEEE 802.15.

Radio spectrum, even unlicensed, is limited. Despite this, ubiquitous communications using several different standards is foreseen in the near future. Coexistence is not trivial as different standards follow different protocols. Moreover, regulations, initially intended to provide fair sharing, are constantly changing to allow for higher data rates, yet moving away from robustness requirements. The use of an unlicensed band poses the challenge of coexistence. In the design phase of a new communication system that has to operate in the unlicensed band, the developer has to design units that will be expected to share the band with:

Incumbent non-communications: Power unintentionally radiated by equipment, for example microwave ovens, will be a source of disturbance.

Incumbent communications: Intended radiation by other communication systems like for example WLAN, Bluetooth®, or Radio Frequency IDentification (RFID) will also be experienced as disturbance when no coordination is applied.

Future systems: Systems that do not exist yet but which will be built in the future can cause severe disturbances. The only known factors are the restrictions imposed upon these systems by the regulations. However, as discussed before, regulations are changing over time, making predictions rather unreliable.

Coexistence can be handled in a number of different ways, as will now be discussed.

Interference mitigation by applying direct-sequence spreading or forward-error-correction coding can be useful, but is usually insufficient due to the near-far problem. That is, in ad-hoc scenarios in particular, a jamming transmitter can come very close to a receiver. The power levels received can thus be sufficiently strong to bring the front-end of the receiver into saturation, which causes clipping. As a result of the clipping (which imposes non-linear effects) the effective gain decreases (desensitization) and intermodulation products arise.

Avoidance is another method of mitigating interference. Avoidance in time can be applied by listening-before-talk or Carrier Sense Multiple Access/Collision Avoidance (CSMA/CA) as applied in IEEE 802.11 and other standards. However, this renders suboptimal solutions because the collision measurements render absolute power levels whereas the Packet Error Rate (PER) depends on the Carrier-to-Interference (C/I) ratio.

Avoidance in frequency is provided by frequency agile techniques such as Dynamic Frequency Selection (DFS). In this method, the system measures where in the frequency band other transmitters are active, and subsequently avoids these frequency segments. This is fine when potential jammers broadcast their presence continuously, for example on a control channel. However, measuring on bursty data channels results in unreliable measurements. Hopping provides better mitigation methods based on frequency avoidance. Because of the large isolation between the intended signal and the jammer when the hopper and jammer do not coincide, rather good robustness can be obtained. However, frequency hopping only works when the jammers are narrowband; likewise, time hopping only works when jammers have a low duty cycle. Incumbent systems in the unlicensed bands usually are bandwidth restricted but are rarely duty cycle restricted, posing a problem for time hopping systems like Ultra-Wideband (UWB) Impulse Radio.

Arranging for the different systems to use different frequencies is another coexistence technique. However, when the different transceivers are located in the very same device or are otherwise very close to one another, practical problems relating to filtering out strong interference result in the use of different frequency bands being insufficient to avoid interference between the different systems unless those different frequency bands are sufficiently separated from one another.

More particularly, when the different systems are sufficiently separated in frequency, coexistence is typically ensured by means of filtering. In this way the systems can be treated independent of one another, as if the other systems were not at all present. In such cases, the performance of each system will be unaffected of operation of the other systems. The cost associated with this approach is the possibility of very hard requirements on the necessary filters. In addition, a filter also causes attenuation loss of the desired signal, known as the insertion loss. This results in degraded sensitivity for systems that employ such hard filtering.

When the different systems operate very close to one another in frequency, filtering is generally not a feasible solution, due to the very hard requirement on the attenuation required to ensure that the victim system will not be severely degraded.

Thus, often the only feasible way of coexistence is the use of time division, in which the systems are coordinated in time so that no two systems are active at the same time. One issue related to coexistence by means of time division is that some kind of collaboration between the systems usually is needed. For instance, if it is known by one system that another system is receiving, the former might delay its transmission not to interfere with the latter. Alternatively, the latter system might choose not to use the information received in case it knows the former is transmitting, and instead rely on that the information can be obtained anyway through powerful coding and time interleaving or possibly by retransmission mechanisms.

Coordination between the systems is, for example, the typical approach used when Bluetooth® and WLAN technology are co-located in the same device. A method known as Packet Traffic Arbitration (PTA) is used, and this results in one of the two standards being given priority over the other one.

A problem with using coexistence solutions based on time division is that the systems that are given low priority might not work well. For instance, it might not be possible to guarantee the desired Quality of Service (QoS) of one system if there is another active system having a higher priority. Another problem is the poor utilization of the available spectrum. If only one system is used at a time, parts of the spectrum will always be unused for data transmission, and effectively used only as a guard band.

Today, the ISM band at 2.4-2.485 GHz is used both by Bluetooth® technology and by WLAN. Both of these incompatible technologies can be found in mobile phones, and the percentage of phones that will have both Bluetooth® and WLAN technology built into them will increase in the future. The bands used for the cellular standards, like the Global System for Mobile Communication (GSM) and Wideband Code Division Multiple Access (WCDMA) are today located several hundred MHz away from the ISM band, and ensuring co-existence between for instance Bluetooth® technology and the cellular standards has been easily achieved by means of filtering. However, with the introduction of technology built in accordance with the Worldwide Interoperability for Microwave Access (WiMAX) standard, which might be used in the 2.3 GHz band, filtering might not be sufficient to ensure co-existence. Also, with the International Mobile Telecommunications-2000 (IMT-2000) extension band located at 2.5-2.69 GHz, filtering alone will not suffice to ensure coexistence with standards using the 2.4 GHz ISM band. IMT-2000 technology (e.g., TD-SCDMA and E-UTRA TDD) will also use the 2.3 GHz band.

As these various communication devices become smaller, the number of transceivers in different devices like mobile phones, personal digital assistants (PDAs), laptop computers, and the like is increasing. This means that co-existence between different systems is an issue that can be expected to become even more pronounced in the future.

Therefore, it is desirable to have methods and apparatuses that enable various radio communication systems to coexist with one another in an efficient way.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that operate a communication device having a first transceiver that operates in a first communication system in the presence of a second transceiver that operates in a second communication system that is unrelated to the first communication system Such operation includes providing access to one or more data packets, wherein each of the packets is for transmission by the first transceiver on either a first type of communication link or a second type of communication link. The first type of communication link has a quality of service requirement that requires retransmission of an already-transmitted packet until successful delivery of the packet is detected by the communication device, and the second type of communication link has a quality of service requirement that permits but does not require retransmission of the already-transmitted packet until successful delivery of the already-transmitted packet is detected by the communication device. For each of a number of transmission time periods, each associated with a respective one of a number of subsequent acknowledgement time periods, a packet transmission scheduling decision is made based, at least in part, on whether a candidate data packet selected from the one or more data packets is for transmission on the first or second type of communication link and on whether the second transceiver is scheduled to transmit an interfering signal during an associated subsequent acknowledgement time period. The interfering signal is one that would disturb reception of a receive status report that would indicate a delivery status of the candidate data packet if the candidate data packet were to be transmitted during the transmission time period.

In some but not necessarily all embodiments, making the packet transmission scheduling decision comprises refraining from scheduling the candidate data packet for transmission during the transmission time period if the candidate data packet is for transmission on the first type of communication link and the second transmitter is scheduled to transmit the interfering signal during the subsequent acknowledgement time period that is associated with the transmission time period.

In some but not necessarily all embodiments, making the packet transmission scheduling decision comprises scheduling the candidate data packet for transmission during the transmission time period if the candidate data packet is for transmission on the second type of communication link regardless of whether the second transmitter is scheduled to transmit the interfering signal during the subsequent acknowledgement time period that is associated with the transmission time period.

In some but not necessarily all embodiments, making the packet transmission scheduling decisions for each of the number of transmission time periods comprises favoring transmission of a data packet for transmission over the second type of communication link during the transmission time periods that are associated with subsequent acknowledgement time periods during which the second transceiver is scheduled to transmit the interfering signal. One way of doing this includes favoring transmission of a data packet for transmission over the first type of communication link during transmission time periods that are associated with subsequent acknowledgement time periods during which the second transceiver is not scheduled to transmit the interfering signal.

In some but not necessarily all embodiments, making the packet transmission scheduling decisions for each of the number of transmission time periods comprises scheduling none of the data packets to be transmitted during the transmission time period in response to determining that the second transceiver is scheduled to perform a receive operation during the transmission time period.

In some but not necessarily all embodiments, the first and second transceivers are co-located in the communication device, and a scheduler associated with the second transceiver signals second transceiver scheduling information to a scheduler associated with the first transceiver. In some of these embodiments, the scheduler associated with the first transceiver signals information to the scheduler of the second transceiver; and the scheduler of the second transceiver makes scheduling decisions to avoid having the second transceiver perform one or more transmissions if quality of service requirements of the first and second communication links have not been fulfilled due to second transceiver transmissions. In some embodiments, the first and second transceivers are collocated within a same user equipment.

In some alternative embodiments, a transmission pattern or a presence of an interfering signal from the second transceiver is estimated without receiving scheduling information from the second transceiver. Such embodiments are useful when signaling between schedulers associated with the first and second transceivers, respectively, is not feasible (e.g., when the first and second transceivers are not collocated within a same device).

BRIEF DESCRIPTION OF THE DRAWINGS

The objects and advantages of the invention will be understood by reading the following detailed description in conjunction with the drawings in which.

DETAILED DESCRIPTION

Figure 1:
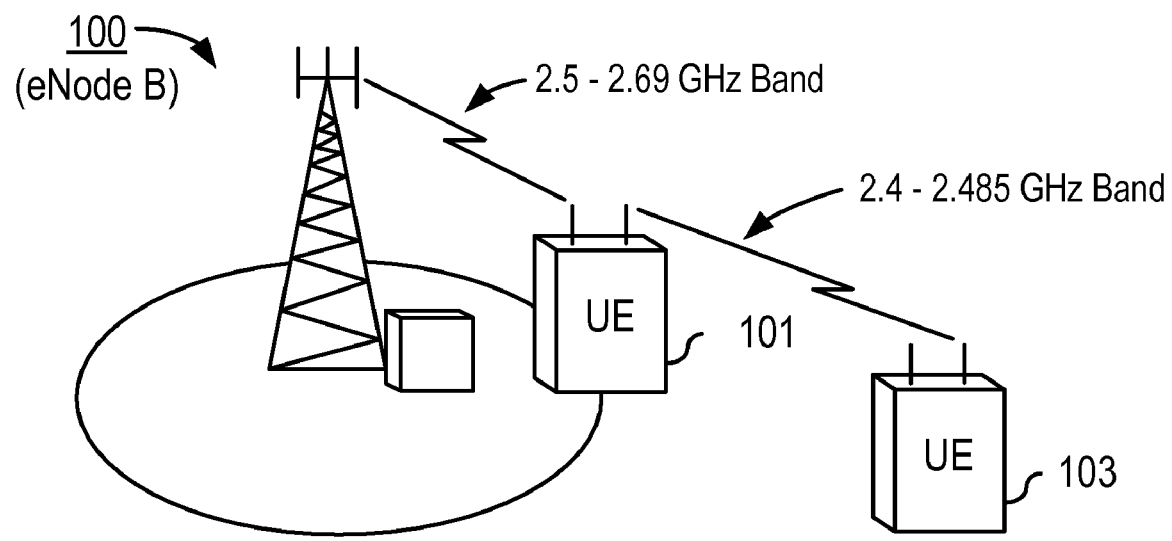
FIG. 1 is a block diagram illustrating coexistence problems that arise when a user equipment communicates with a Node B of a cellular telecommunications system using one frequency band, and also communicates with a second user equipment using a second frequency band.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

The inventors have recognized that when communication systems employ automatic repeat request (ARQ) technology, co-existence solutions that are currently in use introduce a number of inefficiencies. This will now be described.

In many applications, an ARQ strategy is used to ensure that a data packet is delivered correctly. The transmitter sends a packet and waits for a receipt status report from the receiver. A receipt status report indicating acknowledgement (ACK) means that the packet is considered to be correctly received. In case the receiver does not receive the packet correctly, it returns a receipt status report indicating a negative acknowledgement (NACK) of the packet. In response to receiving a NACK, the transmitter re-transmits the packet.

It can also happen that neither an ACK nor a NACK is received by the transmitter of the packet, which means that the transmitter does not know whether the reception was successful or not. Since, in most cases, it is worse for the receiver to lose a packet than for the transmitter to transmit a packet an extra (unnecessary) time, it is commonplace for the transmitter to always re-transmit the packet when no receipt status report has been received in response to a packet transmission. This procedure is commonly referred to as an "implicit NACK", since the action taken is the same as if a NACK had been received.

The implicit NACK procedure inherently means that, at least occasionally, a packet will be needlessly retransmitted because an ACK message has been lost. Since this reduces the amount of useful data that can be transmitted, the percentage of packets re-transmitted due to an implicit NACK should be kept as small as possible. In order to minimize the risk that an ACK/NACK is not received correctly, the receipt status report (i.e., ACK/NACK) is typically transmitted using more robust coding and modulation than is used for the actual data. For example, in cellular communication systems, control data is typically transmitted in a more robust fashion than the actual user data, so the ACK/NACK information is simply included as part of the control data. Since the link quality, and in particular the interference situation, in a cellular system is well controlled, this means that the error probability of the ACK/NACK information can be kept at a sufficiently low level.

However, in some communication systems, such as those operating in the unlicensed ISM band at 2.45 GHz, the interference is not under control and can vary significantly. This means that even if the receipt status report (ACK/NACK) is more robust than the user data, the probability of not receiving the receipt status report information cannot be made as small as would be desired.

A similar situation arises when two systems are collocated, so that they interfere with one another. To take one example, consider a cellular transceiver using, for example, WiMAX or Long Term Evolution (LTE) operating close to the 2.45 GHz band. Suppose that the cellular transceiver is located in the same device as a Bluetooth® transceiver operating in the 2.45 GHz ISM band. If one of the systems (e.g., LTE) transmits, then reception for the other system (e.g., the Bluetooth® transceiver) might not be successful due to interference caused by the transmitting system. One typically assesses the impact in terms of the Bluetooth® receiver not receiving any user data. However, the inventors have recognized that the receipt status report (i.e., ACK/NACK) will also be lost, causing the Bluetooth® transmitter to re-transmit data in response to the implicit NACK.

An aspect of the invention that addresses this type of inefficiency makes use of the fact that, in many situations, a communication device supports several links concurrently, which typically have very different scheduling requirements due to their having very different Quality of Service (QoS) requirements. In particular, an aspect of embodiments consistent with the invention employ predictions of interference between the two systems, which predictions inform whether a transmission by one system will interfere with reception by the other system. The scheduling algorithm makes use of this information by identifying data for which re-transmission is not essential, and scheduling the identified data in time slots associated with subsequent time slots in which an implicit NACK is expected. Since re-transmission is not essential, the occurrence of an implicit NACK does not result in a re-transmission of the data. In this way the amount of unnecessary re-transmitted packets can be kept at a minimum.

These and other aspects will now be described in greater detail.

To more easily appreciate various aspects of the invention and understand its merits, the description involves two specific known communication standards. However, it should be understood that this is not intended to limit the scope of the invention in any way. To the contrary, the described techniques can equally well be used in connection with other communication standards. Moreover, generalization to more than two standards is also possible.

FIG. 1 is a block diagram of an eNode B (base station) 100 of a cellular telecommunications system. In this example, the air interface of the cellular communications system operates in accordance with LTE standards, and communications take place in the 2.5-2.69 GHz band. To illustrate coexistence situations, a first user equipment (UE) 101 is depicted that has first and second transceiver circuitry. To enable the first UE 101 to communicate with the eNode B 100, the first UE's second transceiver circuitry is designed to operate in accordance with any version/release of the LTE standard.

The first user equipment's first transceiver circuitry is designed to operate in accordance with Bluetooth® standards, and these communications take place in the 2.4-2.485 GHz ISM band. As is well-known, Bluetooth® technology utilizes adaptive frequency hopping spread spectrum techniques, which avoid using crowded frequencies in the hopping sequence, thereby improving resistance to radio frequency interference. In the illustrated example, the first user equipment 101 is engaged in Bluetooth®-compatible communications with a second user equipment 103.

In the example illustrated in FIG. 1, the first transceiver's communications in the 2.4-2.485 GHz band are subject to interference from the second transceiver's operation in the 2.5-2.69 GHz band, and (at least in some operating modes) vice versa. The co-location of the first and second transceivers within the same device (e.g., the first user equipment 101) makes this especially problematic.

Figure 2:
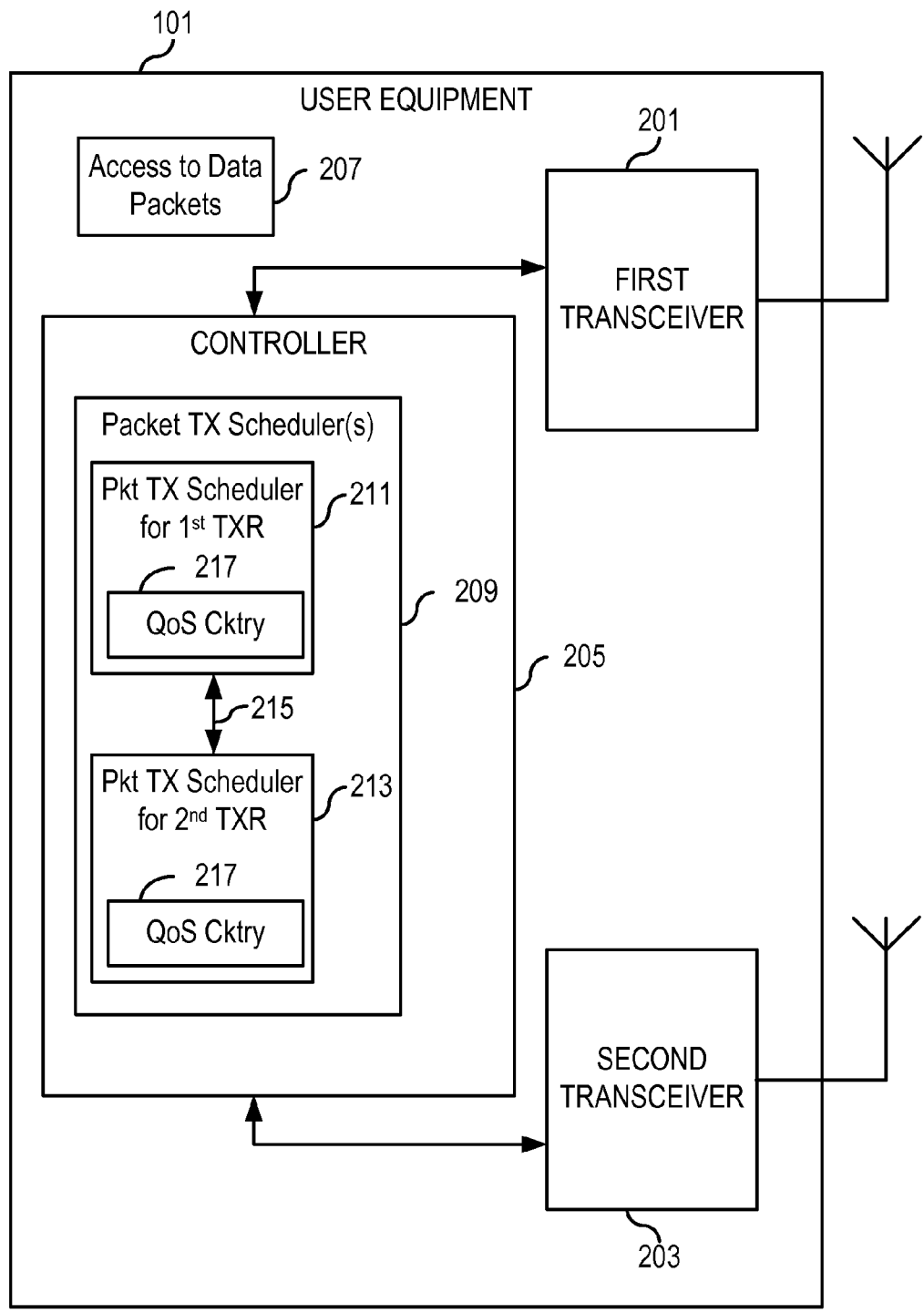
FIG. 2 is a block diagram of an exemplary user equipment adapted to carry out various aspects of the invention.

To address the problems illustrated in FIG. 1, the user equipment 101 comprises circuitry configured to operate the one or more transceivers housed within those devices to enable coexistence to occur. FIG. 2 is a block diagram of an exemplary user equipment 101 adapted to carry out various aspects of the invention. The user equipment 101 includes a first transceiver 201 that operates in accordance with a first standard (e.g., Bluetooth®) in the 2.4-2.485 GHz ISM band, and a co-located second transceiver 203 that operates in accordance with a second standard (e.g., LTE) in the 2.5-2.69 GHz band. A controller 205 comprises circuitry configured to operate the first and second transceivers in a way that strives to achieve optimum performance of the first and second transceivers 201, 203 while enabling their operation to coexist with one another. Those having ordinary skill in the art will appreciate that in practice, a user equipment 101 includes other well-known circuitry (e.g., user interface circuitry, channel estimation circuitry, other processing circuitry, etc.) whose operation is unrelated to the present invention and that, for the sake of clarity, has been omitted from the figure.

Suppose that the second transceiver 203 uses the Frequency Division Duplex (FDD) mode of LTE, in which uplink (UL) transmissions are allocated to the 2500-2570 MHz band and in which downlink (DL) transmissions are allocated to the 2620-2690 MHz band. Further suppose that UL transmissions from the second (LTE) transceiver 203 will completely ruin the first transceiver's Bluetooth®-compliant reception because of the small frequency separation between LTE UL and Bluetooth® DL and the very close proximity of the two transceivers. By contrast, in this operating mode, the first transceiver's Bluetooth®-compliant transmissions will not have any impact on the second transceiver's LTE-compliant reception due to the LTE DL frequency band being located more than 100 MHz away from the ISM band.

Figure 3:
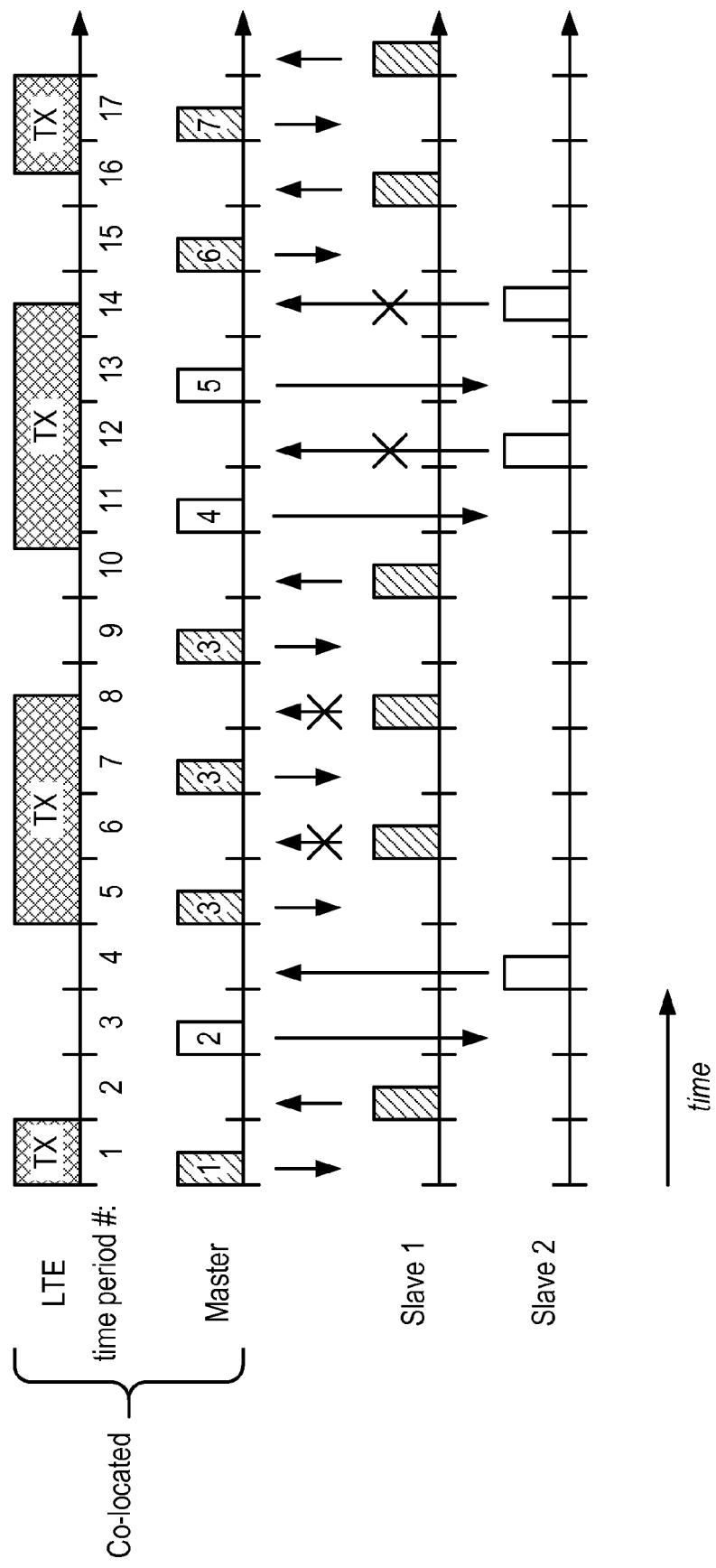
FIG. 3 is a signal timing diagram that illustrates an interference situation from the point of view of a first (e.g., Bluetooth®) transceiver when that transceiver is acting as a master of a piconet in the presence of a second (e.g., LTE) transceiver.

FIG. 3 is a signal timing diagram that illustrates an interference situation from the point of view of the first (Bluetooth®) transceiver 201 when that transceiver is acting as a master of a piconet. The master communicates with two slaves: slave 1 and slave 2. In this example, slave 1 is downloading data, so it is necessary to ensure that the data is correctly received. On the other hand, slave 2 in this example is receiving streaming audio. Due to delay constraints, a packet will not be retransmitted; instead, lost packets will be taken care of in the audio processing by known means, such as error concealment. In FIG. 3, a crossed arrow indicates that a transmitted packet has been lost. It can be seen in this example that all packets transmitted by the master are correctly received by the corresponding slave. However, the packets intended to be received by the master will be ruined whenever the LTE transceiver (e.g., second transceiver 203) is transmitting at the same time that the master (e.g., first transceiver 201) is trying to receive. To illustrate the effects of this interaction, FIG. 3 shows that the master transmits packet 3 in time period 5. This packet is correctly received by the slave 1 (remember that the LTE's uplink transmissions do not affect the master's downlink transmissions), but the LTE transceiver's continued transmission in time period 6 prevents the master from receiving the receiver status report (ACK). The lost ACK results in an implicit NACK, so the master again transmits packet 3, this time in time period 7. Again, the packet is correctly received by slave 1, but the corresponding ACK transmitted to the master in time period 8 is lost due to the LTE transceiver's continued transmission. Again this results in an implicit NACK which causes the master to transmit packet 3 a third time (in time period 9). The LTE transceiver is not transmitting in time period 10, so the master receives the corresponding receive status report in time period 10. The ACK indicated by the receive status report allows the master to know that packet 3 was correctly received, so it can move on to transmit other packets. It will be recognized that interference from the LTE resulted in packet 3 being retransmitted twice (sent three times in total), even though it was actually correctly received by slave 1 in the first and second attempts. It is desirable to eliminate (or at least reduce) this type of inefficiency.

Considering the illustration further, it can be seen that the master transmits packets 4 and 5 to slave 2 during respective time periods 11 and 13. This results in corresponding receive status reports (ACKs) being transmitted by slave 2 in respective time periods 12 and 14. The LTE receiver's transmission during time periods 12 and 14 causes these receive status reports to be lost. However, since there is no requirement that packets 4 and 5 be correctly received, no retransmission will be performed. Thus, the inefficiencies experienced with respect to slave 1's packet 3 do not occur in connection with slave 2's packets 4 and 5.

Various aspects of the invention address the above-described as well as other inefficiencies in a communication device having a first transceiver (e.g., a Bluetooth® transceiver operating as a master device) that operates in a first communication system (e.g., a Bluetooth® piconet) in the presence of a second transceiver that operates in a second communication system (e.g., a transceiver configured to operate in an LTE mobile communication system) that is unrelated to the first communication system. In one aspect of embodiments consistent with the invention, the communication device is provided access 207 to one or more data packets, wherein each of the packets is for transmission by the first transceiver on either a first type of communication link or a second type of communication link, wherein the first type of communication link has a quality of service requirement that requires retransmission of an already-transmitted packet until successful delivery of the packet is detected by the communication device, and the second type of communication link has a quality of service requirement that permits but does not require retransmission of the already-transmitted packet until successful delivery of the already-transmitted packet is detected by the communication device. The first type of communication link is exemplified by (but not limited to) a slave communication device that is downloading data from the first transceiver, as described above with respect to FIG. 3. The second type of communication link is exemplified by (but not limited to) a slave communication device that is receiving streaming audio from the first transceiver, as described above with respect to FIG. 3.

Further in accordance with an aspect of embodiments consistent with the invention, for each of a number of transmission time periods, each associated with a respective one of a number of subsequent acknowledgement time periods, a packet transmission scheduling decision is made by circuitry configured to make a packet transmission scheduling decision 209 based, at least in part, on whether a candidate data packet selected from the one or more data packets is for transmission on the first or second type of communication link and on whether the second transceiver is scheduled to transmit an interfering signal during an associated subsequent acknowledgement time period, which interfering signal would disturb reception of a receive status report that would indicate a delivery status of the candidate data packet if the candidate data packet were to be transmitted during the transmission time period. The circuitry configured to make a packet transmission scheduling decision 209 in this example includes a scheduler 211 for the first transceiver 201 and a scheduler 213 for the second transceiver 203.

Figure 4:
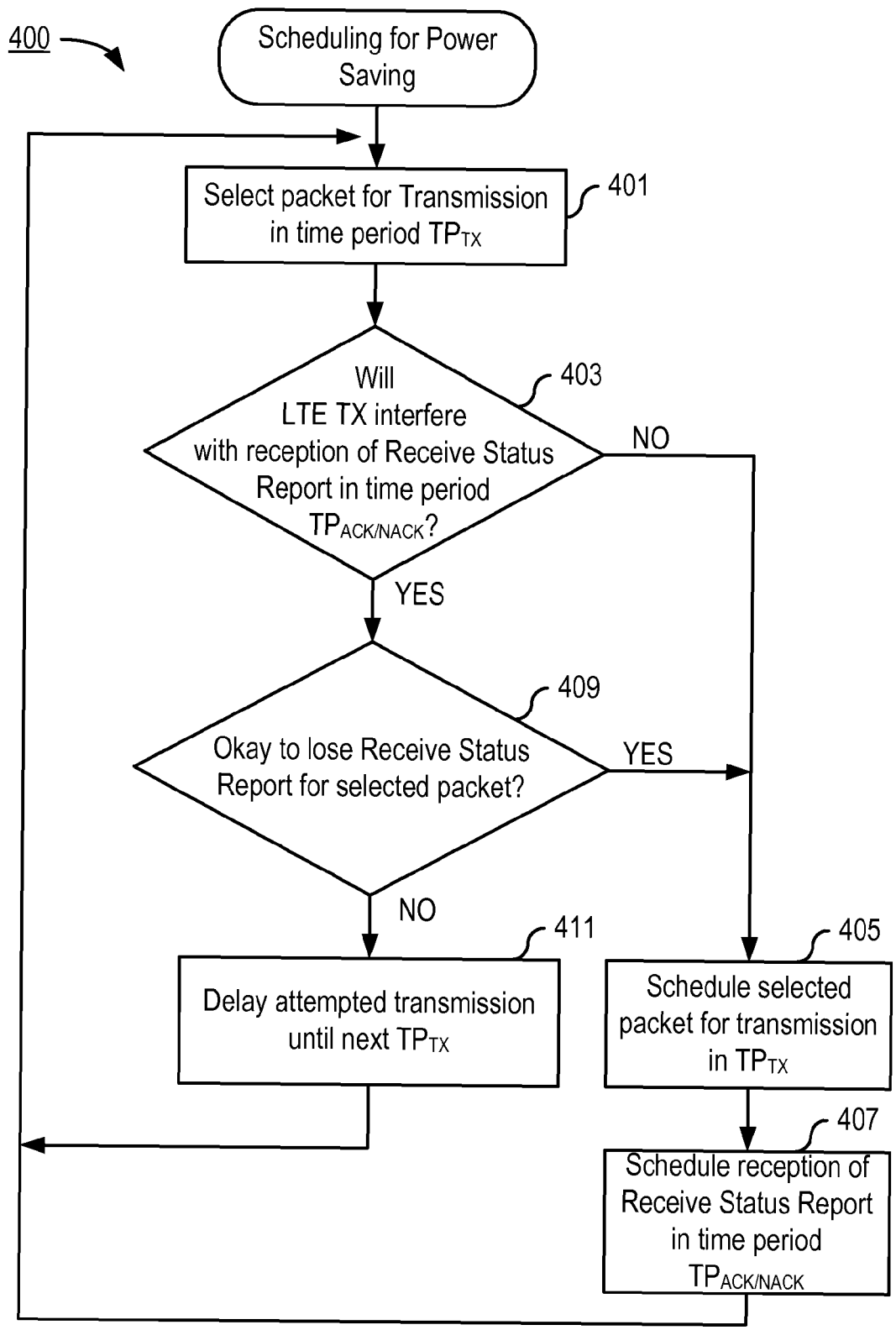
FIG. 4 is, in one respect, a flow diagram of exemplary steps/processes carried out by a user equipment in accordance with aspects of the invention in an exemplary embodiment.

It will be seen that these principles can be employed in a number of different alternative embodiments. FIG. 4 is, in one respect, a flow diagram of exemplary steps/processes carried out by a user equipment (e.g., by the controller 205 in the user equipment 101) in accordance with aspects of the invention in an exemplary embodiment. FIG. 4 can also be considered to depict an exemplary user equipment 400 comprising various circuitry configured to carry out the functions described herein. This embodiment is particularly useful for scheduling data packet transmissions in a way that conserves power in the user equipment.

The illustrated control logic of this embodiment operates as a loop. Initially, a candidate data packet (e.g., any data packet that is not already scheduled for transmission in a particular time period) is selected from among those to which the first transceiver's scheduler has access (step 401). The candidate data packet is now being considered for transmission during a particular time period, herein denoted $TP_{TX}$. The transmission time period $TP_{TX}$ is associated with a subsequent acknowledgement time period, denoted $TP_{ACK/NACK}$, such that if the candidate data packet is transmitted during the time period, $TP_{TX}$, then the scheduler should also plan for a receive status report (e.g., ACK/NACK) to be received in the associated acknowledgement time period.

In the exemplary embodiment, the scheduler for the second transceiver signals information to the scheduler for the first transceiver, such as by means of the signaling circuitry 215 schematically depicted in FIG. 2, so that the first transceiver's scheduler has knowledge of the second transceiver's planned activities. In an alternative exemplary embodiment, the transmission pattern or the presence of an interfering signal from the second transceiver is estimated by the first transceiver. This alternative embodiment may be used when signaling between the systems is not feasible. Having selected a candidate data packet for transmission in the time period $TP_{TX}$, the scheduler ascertains whether the second transceiver's operation (e.g., transmission) during the associated acknowledgement time period $TP_{ACK/NACK}$ will interfere with reception of the expected receive status report (decision block 403). If not ("NO" path out of decision block 403), then the candidate data packet is scheduled for transmission in the time period, $TP_{TX}$, (step 405), and the first transceiver's scheduler also schedules reception of the expected receive status report to take place in the associated acknowledgement time period, $TP_{ACK/NACK}$ (step 407). Processing then jumps back to step 401 to begin scheduling another data packet for transmission in another transmission time slot.

However, if the scheduler ascertains that the second transceiver's operation (e.g., transmission) during the associated acknowledgement time period $TP_{ACK/NACK}$ will interfere with reception of the expected receive status report ("YES" path out of decision block 403), then the scheduler further ascertains whether it is acceptable to lose the receive status report associated with the candidate data packet's transmission (decision block 409). For example, if the candidate data packet is for transmission over a communication link used for providing audio information, an implicit NACK is acceptable because the candidate data packet will not be retransmitted anyway; thus, there will not be any inefficiencies caused by loss of the receive status report. By comparison, if the candidate data packet is for transmission over a communication link that is used for downloading a data file, then it must be retransmitted in the event of an implicit NACK. Clearly this would be inefficient if the candidate data packet had been correctly received but the receive status report indicating that successful receipt had been lost due to the second transceiver's operation.

Accordingly, if the first transceiver's scheduler ascertains that it is acceptable to lose the associated receive status report if the candidate data packet is transmitted in the time period $TP_{TX}$ ("YES" path out of decision block 409), then the candidate data packet is scheduled for transmission in the time period, $TP_{TX}$, (step 405), and the first transceiver's scheduler also schedules reception of the expected receive status report to take place in the associated acknowledgement time period, $TP_{ACK/NACK}$ (step 407). Processing then jumps back to step 401 to begin scheduling another data packet for transmission in another transmission time slot.

However, if the first transceiver's scheduler ascertains that it is not acceptable to lose the associated receive status report if the candidate data packet is transmitted in the time period $TP_{TX}$ ("NO" path out of decision block 409), then the candidate data packet is not scheduled for transmission in the time period, $TP_{TX}$, but rather is put into a pool of available unscheduled data packets so that it can be considered for transmission at a later time (step 411). Processing then jumps back to step 401 to try to schedule a different data packet for transmission in this transmission time slot. If none of the not-yet-scheduled data packets can be scheduled for transmission in this particular transmission time period, then another transmission time period will be selected and the process repeated (not shown).

In practice, a scheduler may consider other factors. For example, data packets in the pool of not-yet-transmitted data packets may grow stale (i.e., too old to be useful to the intended recipient) and need to be removed from the pool. Or, it may be necessary to assign further priorities to scheduling transmission of some data packets ahead of others. These non-limiting examples are application specific, and do not affect the principles upon which the various embodiments of the invention are based, nor are they within the scope of the invention. Therefore, their further description is unnecessary here.

Figure 5:
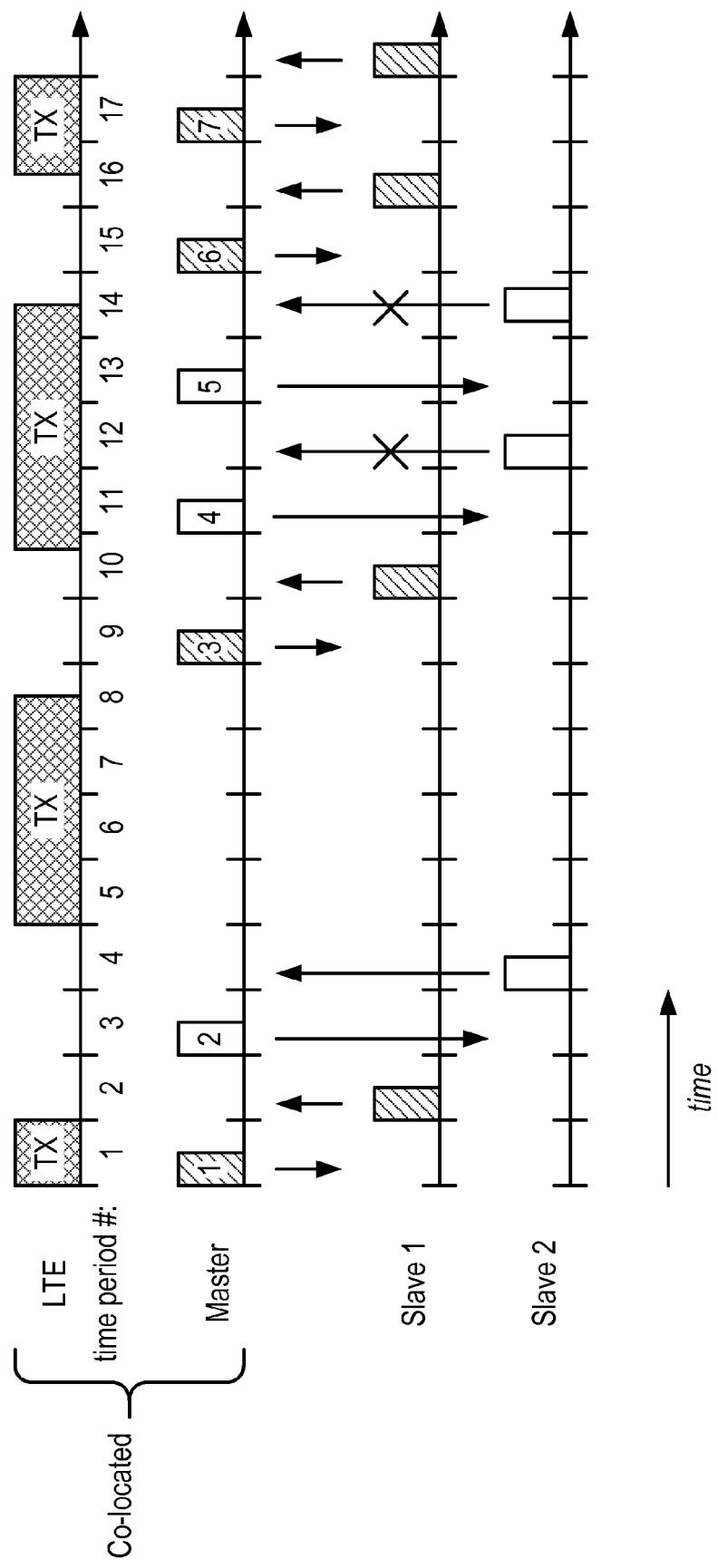
FIG. 5 is a signal timing diagram that illustrates an interference situation from the point of view of a first (e.g., Bluetooth®) transceiver when that transceiver is acting as a master of a piconet in the presence of a second (e.g., LTE) transceiver and the first transceiver's schedule operates in accordance with a first embodiment.

FIG. 5 is a signal timing diagram that illustrates an interference situation from the point of view of the first (Bluetooth®) transceiver 201 when that transceiver is acting as a master of a piconet. As with the example illustrated by FIG. 3, the master of the piconet communicates with two slaves: slave 1 and slave 2. In this example, slave 1 is downloading data, so it is necessary to ensure that the data is correctly received. By comparison, slave 2 in this example is receiving streaming audio. Due to delay constraints, a packet will not be retransmitted; instead, lost packets will be taken care of in the audio processing by known means, such as error concealment. What this means is that it is not acceptable for the master to lose slave 1's receive status report because the implicit NACK would require retransmission of the associated data packet regardless of whether that data packet was actually received without problems, whereas it is acceptable to for the master to lose slave 2's receive status report because it is not necessary to retransmit a data packet in the case of an implicit NACK. In FIG. 5, a crossed arrow indicates that a transmitted packet has been lost.

In carrying out the scheduling algorithm as illustrated by FIG. 4, the first transceiver's scheduler knows that any packets intended to be received by the master will be ruined whenever the LTE transceiver (e.g., second transceiver 203) is transmitting at the same time that the master (e.g., first transceiver 201) is trying to receive. Accordingly, when packet 1 is considered for transmission to slave 1 in time period 1, it is in fact scheduled for transmission in that time slot because the scheduler knows that the second (LTE) transceiver is not scheduled to interfere with the master's receipt of the receive status report that will arrive in time period 2. Similar logic flow applies with respect to the scheduling of packets 2, 6, and 7.

With respect to packet 3, in this example this packet is assumed to have been made available at least in time for transmission in time period 5. (Compare with FIG. 3.) However, since packet 3 is associated with a type of communication link that requires retransmission in case of a NACK, and since an implicit NACK is expected because of the second (LTE) transceiver's scheduled transmission during subsequent acknowledgement time period 6, the scheduler expects that it will have to retransmit packet 3 in any case. Accordingly, it decides not to schedule packet 3 for transmission in time period 5. Similar reasoning causes the schedule to refrain from scheduling transmission of packet 3 in any of the remaining time periods (6 through 8) during which the second (LTE) transceiver is transmitting. The first transceiver's scheduler eventually ascertains that transmission of packet 3 can be transmitted during time period 9 because receipt of its associated receive status report will not be interfered with in acknowledgement time period 10. (The reader may observe that it appears also possible to schedule transmission of packet 3 to take place during time period 8, since the second (LTE) transceiver has no scheduled transmission during time period 9. In some embodiments this may be possible, but the present examples assume a time division duplex (TDD) mode of operation in which the master of a Bluetooth® piconet transmits in odd slots and slaves in the even ones, thereby preventing packet 3 from being transmitted during time period 8.)

By contrast, the scheduler of first transceiver ascertains that the receive status reports associated with acknowledgement time slots 12 and 14 will be interfered with by the second transceiver's transmissions, but it nonetheless schedules data packets 4 and 5 for transmission during respective time periods 11 and 13 because packets 4 and 5 are for transmission over a communication link that does not require retransmission in the event of an implicit NACK.

Comparing the scheduling of FIG. 5 with that of the example shown in FIG. 3 it can be seen that the inefficiency of transmitting packet 3 three times has been eliminated.

Figure 6:
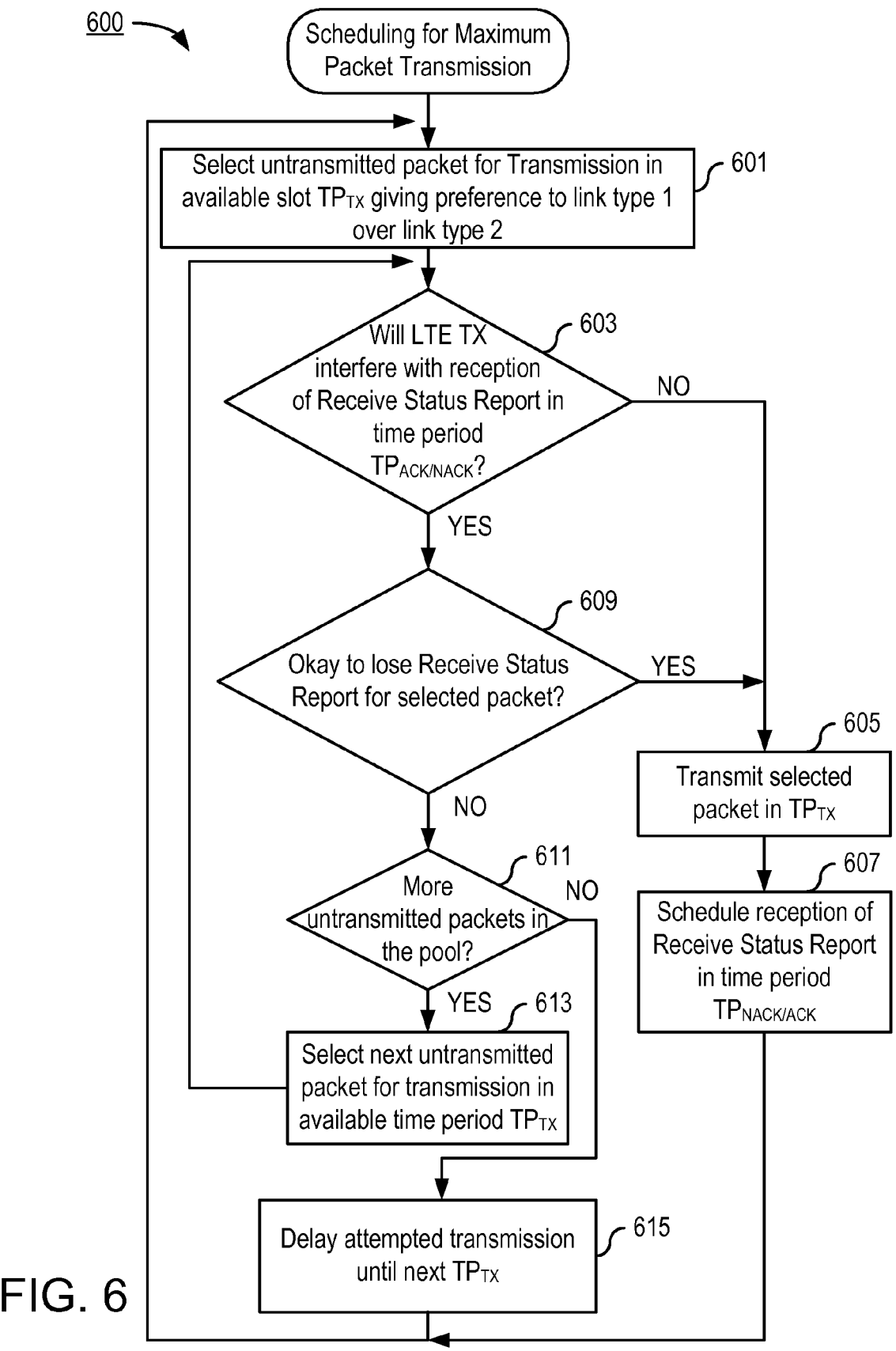
FIG. 6 is, in one respect, a flow diagram of exemplary steps/processes carried out by a user equipment in accordance with aspects of the invention in an alternative exemplary embodiment.

FIG. 6 is, in one respect, a flow diagram of exemplary steps/processes carried out by a user equipment (e.g., by the controller 205 in the user equipment 101) in accordance with aspects of the invention in an alternative exemplary embodiment. FIG. 6 can also be considered to depict an exemplary user equipment 600 comprising various circuitry configured to carry out the functions described herein. This embodiment is particularly useful for scheduling data packet transmissions in a way that attempts to maximize the number of data packets that are communicated without retransmission during a given time length of time.

The illustrated control logic of this embodiment operates as a loop. Initially, a candidate data packet (e.g., any data packet that is not already scheduled for transmission in a particular time period) is selected from among those to which the first transceiver's scheduler has access (step 601). In making this selection, available data packets for transmission over a first type of communication link ("type 1" in the figure) for which retransmission of the data packet always occurs in response to an implicit NACK, are given preference over available data packets for transmission over a second type of communication link ("type 2" in the figure) for which retransmission of the data packet need not occur in response to an implicit NACK. The candidate data packet is now being considered for transmission during a particular time period, herein denoted $TP_{TX}$. The transmission time period $TP_{TX}$ is associated with a subsequent acknowledgement time period, denoted $TP_{ACK/NACK}$, such that if the candidate data packet is transmitted during the time period, $TP_{TX}$, then the scheduler should also plan for a receive status report (e.g., ACK/NACK) to be received in the associated acknowledgement time period.

As with other exemplary embodiments, the scheduler for the second transceiver in this embodiment may signal information to the scheduler for the first transceiver, so that the first transceiver's scheduler has knowledge of the second transceiver's planned activities. In an alternative exemplary embodiment, the transmission pattern or the presence of an interfering signal from the second transceiver is estimated by the first transceiver. This alternative embodiment may be used when signaling between the systems is not feasible. Having selected a candidate data packet for transmission in the time period $TP_{TX}$, the scheduler ascertains whether the second transceiver's operation (e.g., transmission) during the associated acknowledgement time period $TP_{ACK/NACK}$ will interfere with reception of the expected receive status report (decision block 603). If not ("NO" path out of decision block 603), then the candidate data packet is scheduled for transmission in the time period, $TP_{TX}$, (step 605), and the first transceiver's scheduler also schedules reception of the expected receive status report to take place in the associated acknowledgement time period, $TP_{ACK/NACK}$ (step 607). Processing then jumps back to step 601 to begin scheduling another data packet for transmission in another transmission time slot.

However, if the scheduler ascertains that the second transceiver's operation (e.g., transmission) during the associated acknowledgement time period $TP_{ACK/NACK}$ will interfere with reception of the expected receive status report ("YES" path out of decision block 603), then the scheduler further ascertains whether it is acceptable to lose the receive status report associated with the candidate data packet's transmission (decision block 609). For example, if the candidate data packet is for transmission over a communication link used for providing audio information, an implicit NACK is acceptable because the candidate data packet will not be retransmitted anyway; thus, there will not be any inefficiencies caused by loss of the receive status report. By comparison, if the candidate data packet is for transmission over a communication link that is used for downloading a data file, then it must be retransmitted in the event of an implicit NACK. Clearly this would be inefficient if the candidate data packet had been correctly received but the receive status report indicating that successful receipt had been lost due to the second transceiver's operation.

Accordingly, if the first transceiver's scheduler ascertains that it is acceptable to lose the associated receive status report if the candidate data packet is transmitted in the time period $TP_{TX}$ ("YES" path out of decision block 609), then the candidate data packet is scheduled for transmission in the time period, $TP_{TX}$, (step 605), and the first transceiver's scheduler also schedules reception of the expected receive status report to take place in the associated acknowledgement time period, $TP_{ACK/NACK}$ (step 607). Processing then jumps back to step 601 to begin scheduling another data packet for transmission in another transmission time slot.

However, if the first transceiver's scheduler ascertains that it is not acceptable to lose the associated receive status report if the candidate data packet is transmitted in the time period $TP_{TX}$ ("NO" path out of decision block 609), then the candidate data packet is not scheduled for transmission in the time period, $TP_{TX}$, but rather remains in the pool of available unscheduled data packets so that it can be considered for transmission at a later time. In order to maximize transmission time period utilization, the first transceiver's scheduler ascertains whether there are any other untransmitted data packets in the pool (decision block 611). If not ("NO" path out of decision block 611), the scheduler delays any attempted transmission until a next transmission time period (step 615). Processing then jumps back to step 601 to try to schedule a data packet for transmission in the next transmission time slot.

If there is another untransmitted packet in the pool that has not yet been tested for transmission in the present transmission time period $TP_{TX}$ ("YES" path out of decision block 611), then a next untransmitted packet is selected to be the next candidate data packet for transmission in the time period $TP_{TX}$ (step 613), and processing jumps back to step 603 to try to schedule the new candidate data packet for transmission in accordance with the principles of the invention. In making the selection, untransmitted data packets for transmission over a type 1 link are given preference over data packets for transmission over a type 2 link.

Figure 7:
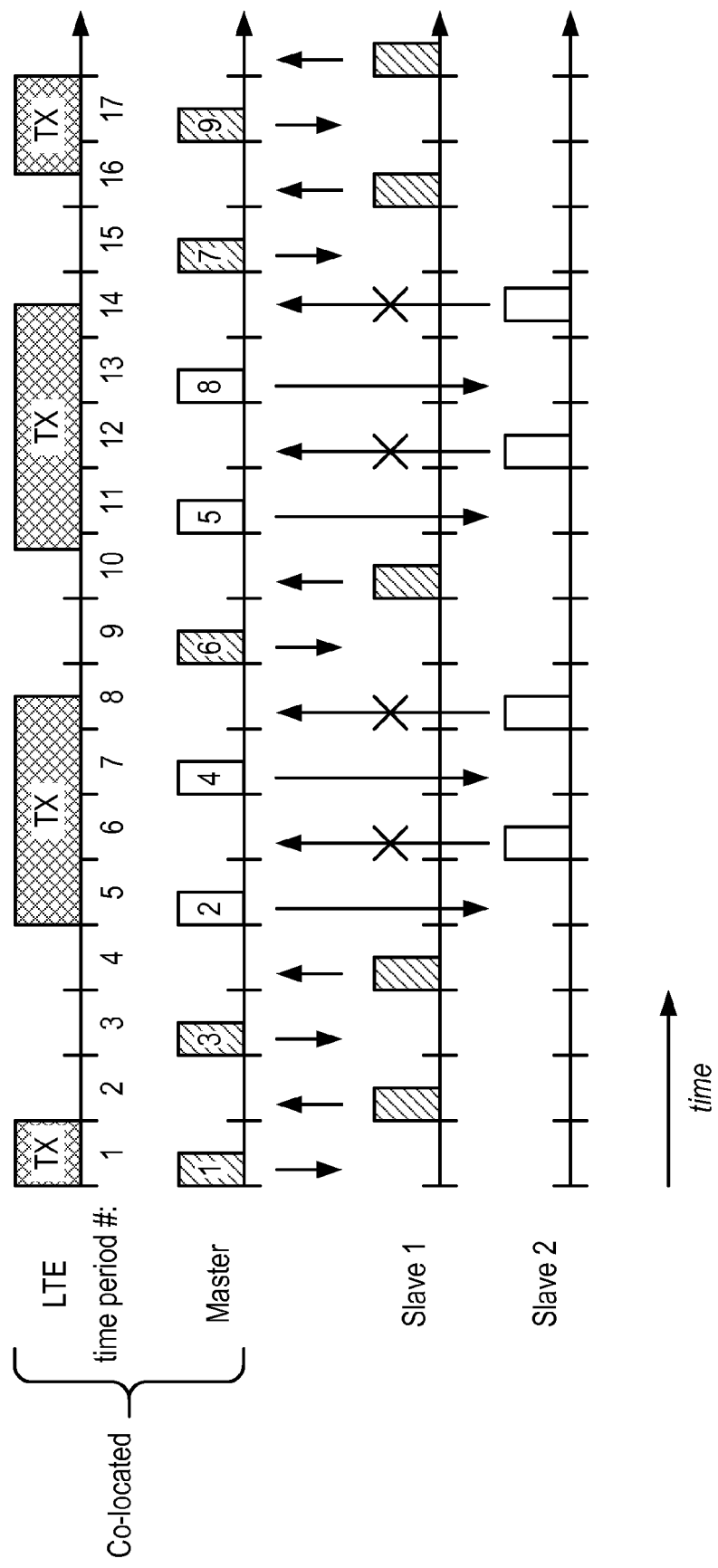
FIG. 7 is a signal timing diagram that illustrates an interference situation from the point of view of a first (e.g., Bluetooth®) transceiver when that transceiver is acting as a master of a piconet in the presence of a second (e.g., LTE) transceiver and the first transceiver's schedule operates in accordance with a second embodiment.

FIG. 7 is a signal timing diagram that illustrates an interference situation from the point of view of the first (Bluetooth®) transceiver 201 when that transceiver is acting as a master of a piconet. As with the example illustrated by FIG. 3, the master of the piconet communicates with two slaves: slave 1 and slave 2. In this example, slave 1 is downloading data, so it is necessary to ensure that the data is correctly received. By comparison, slave 2 in this example is receiving streaming audio. Due to delay constraints, a packet will not be retransmitted; instead, lost packets will be taken care of in the audio processing by known means, such as error concealment. What this means is that it is not acceptable for the master to lose slave 1's receive status report because the implicit NACK would require retransmission of the associated data packet regardless of whether that data packet was actually received without problems, whereas it is acceptable for the master to lose slave 2's receive status report because it is not necessary to retransmit a data packet in the case of an implicit NACK. In FIG. 7, a crossed arrow indicates that a transmitted packet has been lost.

In accordance with the scheduling embodiment illustrated in FIG. 6, when data packet 1 is a candidate data packet, it is assigned for transmission in transmission period 1 despite the fact that it would have to be retransmitted in the event of an implicit NACK because the first transceiver's scheduler has ascertained that the second (LTE) transceiver is not scheduled to transmit an interfering signal in the associated acknowledge time period (time period 2).

In making a scheduling decision for time period 3, it can be assumed in this example that both data packets 2 and 3 were made available to the scheduler. In selecting a candidate, the scheduler first considers packet 3 as a candidate because packet 3 is for transmission over a "type 1" link (as described above), whereas packet 2 is for transmission over a "type 2" link (also as described above). Packet 3 is assigned for transmission during time period 3 because the second (LTE) transceiver is not scheduled to transmit an interfering signal during time period 4.

In considering the scheduling of time period 5, it can be assumed that packets 2, 4 and 6 are all available to the scheduler. Packet 6 will be considered first as a candidate because it is for transmission over a type 1 link, whereas packets 2 and 4 are for transmission over a type 2 link. However, the scheduler will not schedule packet 6 for transmission during any of the time periods in which the second (LTE) transceiver is transmitting in an associated acknowledgement time period. Rather than performing no transmission at all, the scheduler then considers data packet 2 for transmission during time period 5, and makes this scheduling decision because it is permissible to lose the associated receive status report in subsequent acknowledgement time period 6 (i.e., no retransmission of data packet 2 will occur in the event of an implicit NACK). For the same reasons, data packet 4 is scheduled for transmission during time period 7.

When considering the scheduling of time period 9, data packet 6 is again considered, and this time scheduled for transmission because reception of its receive status report will not be interfered with by the second (LTE) transceiver in time period 10.

Similar scheduling decisions are made with respect to data packets 5 and 8 (communication link type 2 packets) and data packets 7 and 9 (communication link type 1 packets) in time periods 11 through 18.

Comparing the scheduling of FIG. 7 with that of the example shown in FIG. 3 it can be seen that the first transceiver is able to move many more packets to their intended recipients without retransmission during a given time period.

Figure 8:
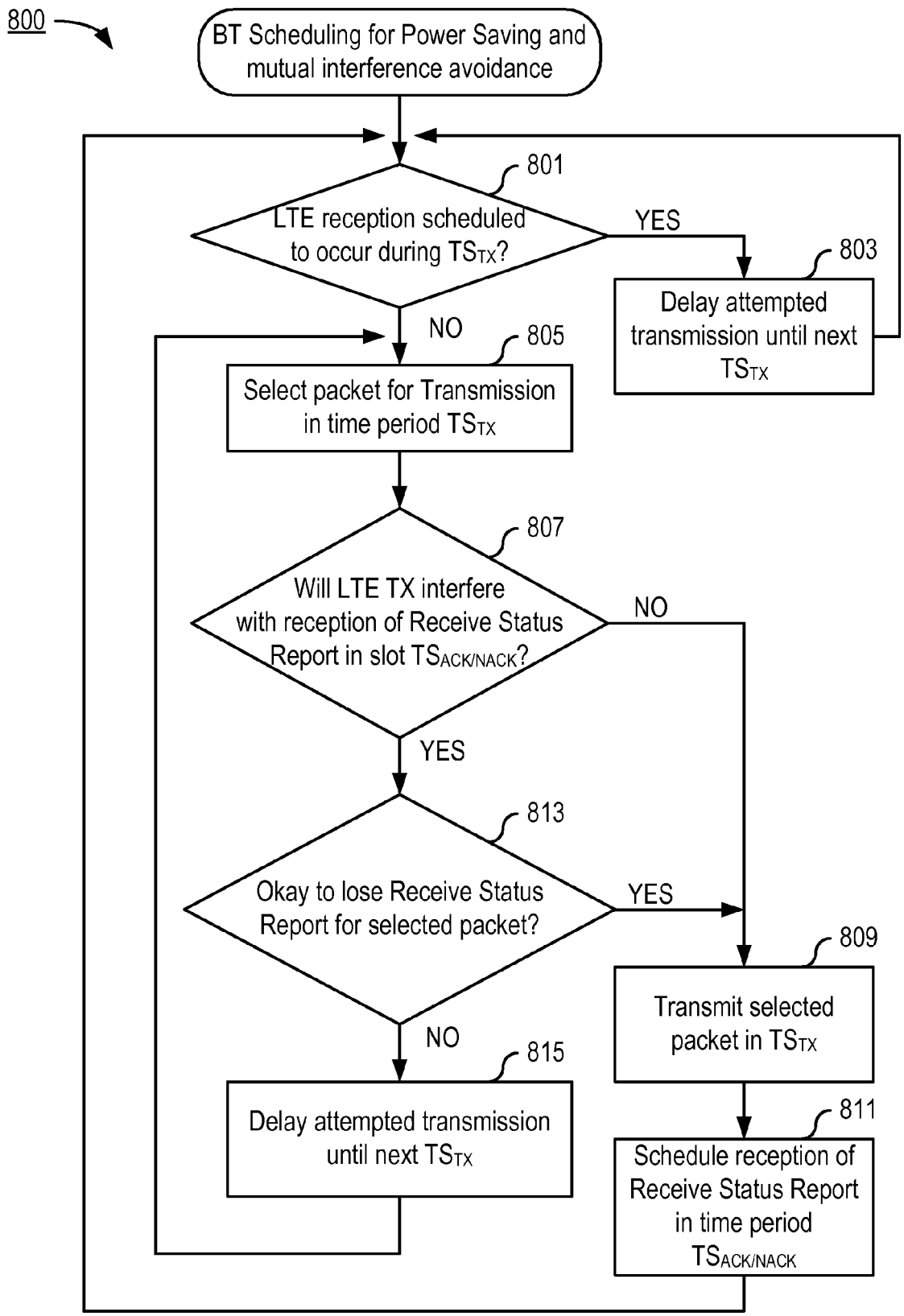
FIG. 8 is, in one respect, a flow diagram of exemplary steps/processes carried out by a user equipment in accordance with aspects of the invention in an another alternative exemplary embodiment.

Yet another exemplary embodiment consistent with the invention is illustrated in FIG. 8, which is, in one respect, a flow diagram of exemplary steps/processes carried out by a user equipment (e.g., by the controller 205 in the user equipment 101) in accordance with aspects of the invention in an exemplary embodiment. FIG. 8 can also be considered to depict an exemplary user equipment 800 comprising various circuitry configured to carry out the functions described herein. This embodiment is particularly useful for scheduling data packet transmissions in a way that conserves power in the user equipment while also providing opportunities for the second (LTE) transceiver to perform a receive operation without being interfered with by transmissions from the first (Bluetooth®) transceiver. In the examples up to this point, this type of interference was assumed not to happen. However, in some embodiments, it is possible that the first transceiver transmission bandwidth will be close enough to the receive bandwidth of the second transceiver to cause such interference.

Like earlier-described embodiments, the illustrated control logic of this embodiment operates as a loop. Initially, the first transceiver's scheduler determines (e.g., with the aid of information signaled by the second (LTE) transceiver or alternatively via estimation by the first transceiver of the transmission pattern or presence of an interfering signal from the second transceiver) whether the second transceiver is scheduled to perform a receive operation during a time period $TS_{TX}$ (decision block 801). If it is ("YES" path out of decision block 801), the first transceiver's scheduler will not schedule the first transceiver to perform any transmissions during the time period $TS_{TX}$, but instead will delay any attempted transmission scheduling until the next transmission time period (step 803).

However, if the second transceiver is not scheduled to perform a receive operation during the time period $TS_{TX}$ ("NO" path out of decision block 801), then the first transceiver's scheduler selects a candidate data packet (e.g., any data packet that is not already scheduled for transmission in a particular time period) from among those to which the first transceiver's scheduler has access (step 805). The candidate data packet is now being considered for transmission during the time period $TP_{TX}$. As in other embodiments, the transmission time period $TP_{TX}$ is associated with a subsequent acknowledgement time period, denoted $TP_{ACK/NACK}$, such that if the candidate data packet is transmitted during the time period, $TP_{TX}$, then the scheduler should also plan for a receive status report (e.g., ACK/NACK) to be received in the associated acknowledgement time period.

In this exemplary embodiment, as with others, the scheduler for the second transceiver signals information to the scheduler for the first transceiver, so that the first transceiver's scheduler has knowledge of the second transceiver's planned activities. Alternatively, the first transceiver estimates a transmission pattern or an interfering signal from the second transceiver. Having selected a candidate data packet for transmission in the time period $TP_{TX}$, the scheduler ascertains whether the second transceiver's operation (e.g., transmission) during the associated acknowledgement time period $TP_{ACK/NACK}$ will interfere with reception of the expected receive status report (decision block 807). If not ("NO" path out of decision block 807), then the candidate data packet is scheduled for transmission in the time period, $TP_{TX}$, (step 809), and the first transceiver's scheduler also schedules reception of the expected receive status report to take place in the associated acknowledgement time period, $TP_{ACK/NACK}$ (step 811). Processing then jumps back to step 801 to begin scheduling another data packet for transmission in another transmission time slot.

However, if the scheduler ascertains that the second transceiver's operation (e.g., transmission) during the associated acknowledgement time period $TP_{ACK/NACK}$ will interfere with reception of the expected receive status report ("YES" path out of decision block 807), then the scheduler further ascertains whether it is acceptable to lose the receive status report associated with the candidate data packet's transmission (decision block 813). For example, if the candidate data packet is for transmission over a communication link used for providing audio information, an implicit NACK is acceptable because the candidate data packet will not be retransmitted anyway; thus, there will not be any inefficiencies caused by loss of the receive status report. By comparison, if the candidate data packet is for transmission over a communication link that is used for downloading a data file, then it must be retransmitted in the event of an implicit NACK. Clearly this would be inefficient if the candidate data packet had been correctly received but the receive status report indicating that successful receipt had been lost due to the second transceiver's operation.

Accordingly, if the first transceiver's scheduler ascertains that it is acceptable to lose the associated receive status report if the candidate data packet is transmitted in the time period $TP_{TX}$ ("YES" path out of decision block 813), then the candidate data packet is scheduled for transmission in the time period, $TP_{TX}$, (step 809), and the first transceiver's scheduler also schedules reception of the expected receive status report to take place in the associated acknowledgement time period, $TP_{ACK/NACK}$ (step 811). Processing then jumps back to step 801 to begin scheduling another data packet for transmission in another transmission time slot.

However, if the first transceiver's scheduler ascertains that it is not acceptable to lose the associated receive status report if the candidate data packet is transmitted in the time period $TP_{TX}$ ("NO" path out of decision block 813), then the candidate data packet is not scheduled for transmission in the time period, $TP_{TX}$, but rather is put into the pool of available unscheduled data packets so that it can be considered for transmission at a later time (step 815). Processing then jumps back to step 805 to try to schedule a different data packet for transmission in this transmission time slot. If none of the not-yet-scheduled data packets can be scheduled for transmission in this particular transmission time period, then another transmission time period will be selected and the process repeated (not shown).

In practice, a scheduler may consider other factors. For example, data packets in the pool of not-yet-transmitted data packets may grow stale (i.e., too old to be useful to the intended recipient) and need to be removed from the pool. Or, it may be necessary to assign further priorities to scheduling transmission of some data packets ahead of others. These non-limiting examples are application specific, and do not affect the principles upon which the various embodiments of the invention are based, nor are they within the scope of the invention. Therefore, their further description is unnecessary here.

It will further be appreciated that an aspect of the invention in which the first transceiver (e.g., a Bluetooth®) transceiver) provides opportunities for the second (e.g., LTE) transceiver to perform a receive operation without being interfered with by transmissions from the first transceiver (e.g., by means of steps/elements 801 and 803) can be incorporated into other embodiments as well, such as the embodiment illustrated by FIG. 6.

Figure 9:
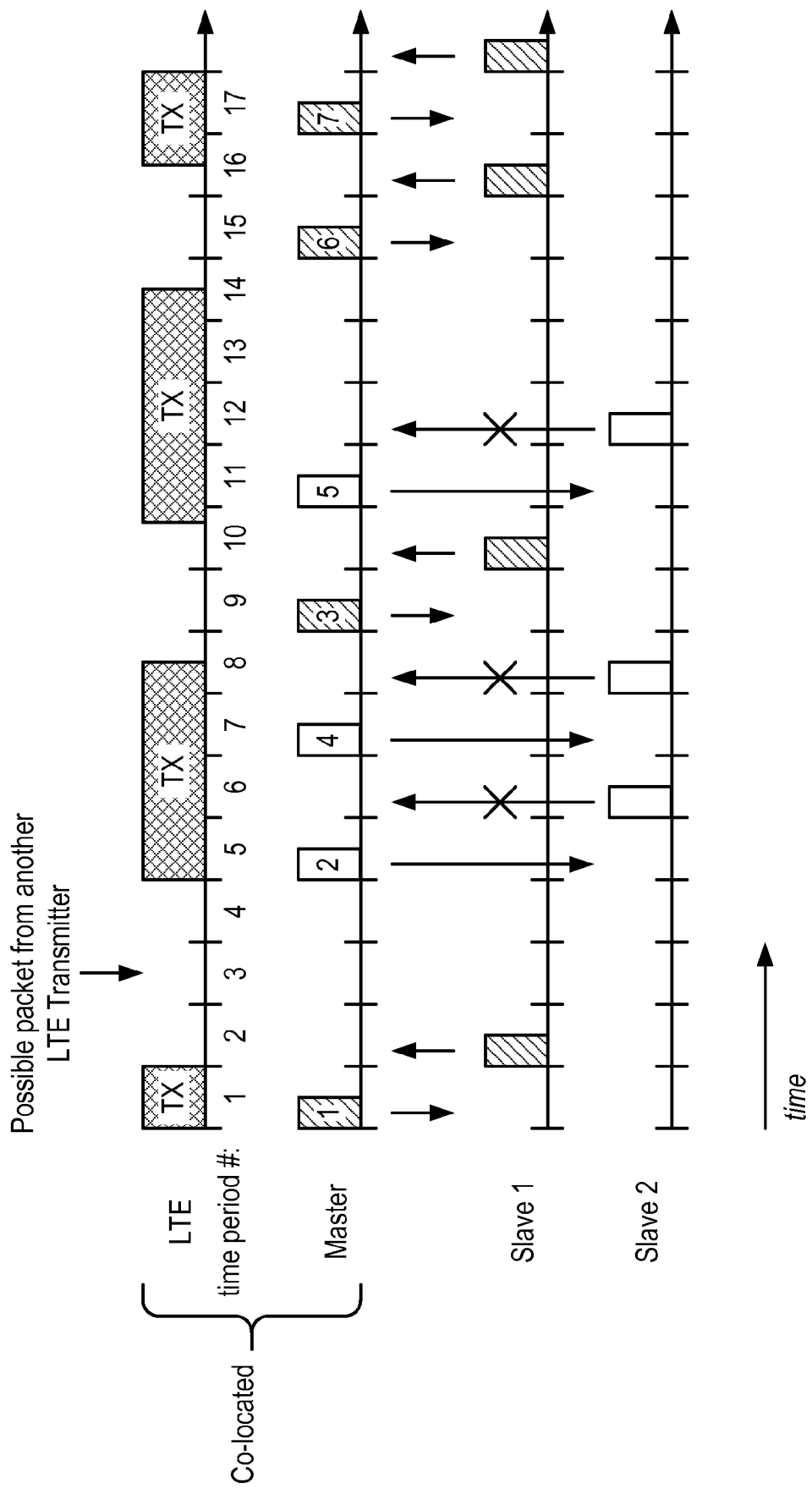
FIG. 9 is a signal timing diagram that illustrates an interference situation from the point of view of a first (e.g., Bluetooth®) transceiver when that transceiver is acting as a master of a piconet in the presence of a second (e.g., LTE) transceiver and the first transceiver's schedule operates in accordance with a third embodiment.

FIG. 9 is a signal timing diagram that illustrates an interference situation from the point of view of the first (Bluetooth®) transceiver 201 when that transceiver is acting as a master of a piconet. As with the example illustrated by FIG. 3, the master of the piconet communicates with two slaves: slave 1 and slave 2. In this example, slave 1 is downloading data, so it is necessary to ensure that the data is correctly received. By comparison, slave 2 in this example is receiving streaming audio. Due to delay constraints, a packet will not be retransmitted; instead, lost packets will be taken care of in the audio processing by known means, such as error concealment. What this means is that it is not acceptable for the master to lose slave 1's receive status report because the implicit NACK would require retransmission of the associated data packet regardless of whether that data packet was actually received without problems, whereas it is acceptable to for the master to lose slave 2's receive status report because it is not necessary to retransmit a data packet in the case of an implicit NACK. In FIG. 9, a crossed arrow indicates that a transmitted packet has been lost.

In carrying out the scheduling algorithm as illustrated by FIG. 8, many of the same scheduling decisions are made based on similar logic as was illustrated in FIG. 5. That is, in this exemplary embodiment the first transceiver's scheduler is attempting to conserve power by avoiding having to retransmit data packets to the extent that scheduling is able to do this. In this regard, the first transceiver's scheduler knows that any packets intended to be received by the master will be ruined whenever the LTE transceiver (e.g., second transceiver 203) is transmitting at the same time that the master (e.g., first transceiver 201) is trying to receive. Accordingly, when packet 1 is considered for transmission to slave 1 in time period 1, it is in fact scheduled for transmission in that time slot because the scheduler knows that the second (LTE) transceiver is not scheduled to interfere with the master's receipt of the receive status report that will arrive in time period 2. Similar logic flow applies with respect to the scheduling of packets 3, 6, and 7.

With respect to packets 2 and 3, in this example these packets can be assumed to have been made available at least in time for transmission in time period 3. However, the second (LTE) transceiver is scheduled to receive data from another LTE transmitter in time period 3. Therefore, in accordance with principles employed in this embodiment, the first transceiver's scheduler leaves time periods 3 and 4 vacant (i.e., no transmissions are made by the first transceiver during these periods).

The first transceiver's scheduler next considers the possibility of performing a transmission during time period 5. Even if packet 3 is available to the scheduler at this time, it cannot be scheduled for transmission during time period 5 because it is associated with a type of communication link that requires retransmission in case of a NACK. In this case, an implicit NACK is expected because of the second (LTE) transceiver's scheduled transmission during subsequent acknowledgement time period 6. Consequently, the scheduler expects that it will have to retransmit packet 3 in any case. Accordingly, it decides not to schedule packet 3 for transmission in time period 5. Similar reasoning causes the schedule to refrain from scheduling transmission of packet 3 in time period 7 during which the second (LTE) transceiver is transmitting. The first transceiver's scheduler eventually ascertains that transmission of packet 3 can be transmitted during time period 9 because receipt of its associated receive status report will not be interfered with in acknowledgement time period 10.

In this example, packet 2 is also available for transmission during time slot 5, and since no retransmission will occur even in the event of an implicit NACK (packet 2 is for transmission over a type 2 communication link), the first transceiver's scheduler arranges for packet 2 to be transmitted during time period 5. Similarly, packet 4 is available and therefore scheduled to be transmitted during time period 7 regardless of the probability that an implicit NACK will occur.

By contrast, the scheduler of first transceiver ascertains that the receive status reports associated with acknowledgement time slots 12 and 14 will be interfered with by the second transceiver's transmissions, but it nonetheless schedules data packet 5 for transmission during time period 11 because packet 5 is for transmission over a communication link that does not require retransmission in the event of an implicit NACK.

Comparing the scheduling of FIG. 9 with that of the example shown in FIG. 3 it can be seen that the inefficiency of transmitting packet 3 three times has been eliminated. In addition, space has been left in time period 3 to permit the second transceiver to perform a receive operation without interference from the first transceiver.

Still other alternative embodiments are possible that employ aspects of the invention. For example, it is further possible to arrange logic 217 in the schedulers of the first and second transceivers so as to have the scheduler associated with the first transceiver signal information to the scheduler of the second transceiver, and to have the scheduler of the second transceiver make scheduling decisions to avoid having the second transceiver perform one or more transmissions if quality of service requirements (QoS) of the first and second communication links have not been fulfilled due to second transceiver transmissions.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:
1. A method of operating a communication device having a first transceiver that operates in a first communication system in the presence of a second transceiver that operates in a second communication system that is unrelated to the first communication system, the method comprising:

providing access to one or more data packets, wherein each of the packets is for transmission by the first transceiver on either a first type of communication link or a second type of communication link, wherein the first type of communication link has a quality of service requirement that requires retransmission of an already-transmitted packet until successful delivery of the packet is detected by the communication device, and the second type of communication link has a quality of service requirement that permits but does not require retransmission of the already-transmitted packet until successful delivery of the already-transmitted packet is detected by the communication device;

for each of a number of transmission time periods, each associated with a respective one of a number of subsequent acknowledgement time periods, making a packet transmission scheduling decision based, at least in part, on whether a candidate data packet selected from the one or more data packets is for transmission on the first or second type of communication link and on whether the second transceiver is scheduled to transmit an interfering signal during an associated subsequent acknowledgement time period, which interfering signal would disturb reception of a receive status report that would indicate a delivery status of the candidate data packet if the candidate data packet were to be transmitted during the transmission time period.

2. The method of claim 1, wherein making the packet transmission scheduling decision comprises refraining from scheduling the candidate data packet for transmission during the transmission time period if the candidate data packet is for transmission on the first type of communication link and the second transmitter is scheduled to transmit the interfering signal during the subsequent acknowledgement time period that is associated with the transmission time period.

3. The method of claim 1, wherein making the packet transmission scheduling decision comprises scheduling the candidate data packet for transmission during the transmission time period if the candidate data packet is for transmission on the second type of communication link regardless of whether the second transmitter is scheduled to transmit the interfering signal during the subsequent acknowledgement time period that is associated with the transmission time period.

4. The method of claim 1, wherein making the packet transmission scheduling decisions for each of the number of transmission time periods comprises favoring transmission of a data packet for transmission over the second type of communication link during the transmission time periods that are associated with subsequent acknowledgement time periods during which the second transceiver is scheduled to transmit the interfering signal.

5. The method of claim 4, wherein making the packet transmission scheduling decisions for each of the number of transmission time periods comprises favoring transmission of a data packet for transmission over the first type of communication link during transmission time periods that are associated with subsequent acknowledgement time periods during which the second transceiver is not scheduled to transmit the interfering signal.

6. The method of claim 1, wherein making the packet transmission scheduling decisions for each of the number of transmission time periods comprises scheduling none of the data packets to be transmitted during the transmission time period in response to determining that the second transceiver is scheduled to perform a receive operation during the transmission time period.

7. The method of claim 1, wherein the first and second transceivers are co-located in the communication device, and the method comprises signaling second transceiver scheduling information by a scheduler associated with the second transceiver to a scheduler associated with the first transceiver.

8. The method of claim 7, wherein the method comprises:
signaling information by the scheduler associated with the first transceiver to the scheduler of the second transceiver; and
making scheduling decisions by the scheduler associated with the second transceiver to avoid having the second transceiver perform one or more transmissions if quality of service requirements of the first and second communication links have not been fulfilled due to second transceiver transmissions.

9. The method of claim 1, comprising estimating a transmission pattern or a presence of an interfering signal from the second transceiver without receiving scheduling information from the second transceiver.

10. An apparatus for controlling a communication device having a first transceiver that operates in a first communication system in the presence of a second transceiver that operates in a second communication system that is unrelated to the first communication system, the apparatus comprising:
circuitry configured to provide access to one or more data packets, wherein each of the packets is for transmission by the first transceiver on either a first type of communication link or a second type of communication link, wherein the first type of communication link has a quality of service requirement that requires retransmission of an already-transmitted packet until successful delivery of the packet is detected by the communication device, and the second type of communication link has a quality of service requirement that permits but does not require retransmission of the already-transmitted packet until successful delivery of the already-transmitted packet is detected by the communication device;
circuitry configured to make a packet transmission scheduling decision for each of a number of transmission time periods, each associated with a respective one of a number of subsequent acknowledgement time periods, wherein the packet transmission scheduling decision is based, at least in part, on whether a candidate data packet selected from the one or more data packets is for transmission on the first or second type of communication link and on whether the second transceiver is scheduled to transmit an interfering signal during an associated subsequent acknowledgement time period, which interfering signal would disturb reception of a receive status report that would indicate a delivery status of the candidate data packet if the candidate data packet were to be transmitted during the transmission time period.

11. The apparatus of claim 10, wherein the circuitry configured to make the packet transmission scheduling decision comprises circuitry configured to refrain from scheduling the candidate data packet for transmission during the transmission time period if the candidate data packet is for transmission on the first type of communication link and the second transmitter is scheduled to transmit the interfering signal during the subsequent acknowledgement time period that is associated with the transmission time period.

12. The apparatus of claim 10, wherein the circuitry configured to make the packet transmission scheduling decision comprises circuitry configured to schedule the candidate data packet for transmission during the transmission time period if the candidate data packet is for transmission on the second type of communication link regardless of whether the second transmitter is scheduled to transmit the interfering signal during the subsequent acknowledgement time period that is associated with the transmission time period.

13. The apparatus of claim 10, wherein the circuitry configured to make the packet transmission scheduling decisions for each of the number of transmission time periods comprises circuitry configured to favor transmission of a data packet for transmission over the second type of communication link during the transmission time periods that are associated with subsequent acknowledgement time periods during which the second transceiver is scheduled to transmit the interfering signal.

14. The apparatus of claim 13, wherein the circuitry configured to make the packet transmission scheduling decisions for each of the number of transmission time periods comprises circuitry configured to favor transmission of a data packet for transmission over the first type of communication link during transmission time periods that are associated with subsequent acknowledgement time periods during which the second transceiver is not scheduled to transmit the interfering signal.

15. The apparatus of claim 10, wherein the circuitry configured to make the packet transmission scheduling decisions for each of the number of transmission time periods comprises circuitry configured to schedule none of the data packets to be transmitted during the transmission time period in response to determining that the second transceiver is scheduled to perform a receive operation during the transmission time period.

16. The apparatus of claim 10, wherein the first and second transceivers are co-located in the communication device, and the apparatus comprises:
circuitry configured to signal second transceiver scheduling information from a scheduler associated with the second transceiver to a scheduler associated with the first transceiver.

17. The apparatus of claim 16, wherein the apparatus comprises:
circuitry configured to signal information from the scheduler associated with the first transceiver to the scheduler associated with the second transceiver; and
circuitry configured to cause the scheduler of the second transceiver to make scheduling decisions to avoid having the second transceiver perform one or more transmissions if quality of service requirements of the first and second communication links have not been fulfilled due to second transceiver transmissions.

18. The apparatus of claim 10, comprising circuitry configured to estimate a transmission pattern or a presence of an interfering signal from the second transceiver without receiving scheduling information from the second transceiver.

19. A user equipment comprising:
the apparatus of claim 10; and
the first transceiver.

20. The user equipment of claim 19, further comprising the second transceiver.

* * * * *